United States Patent [19]

Ziessmer

[11] Patent Number: 5,156,352
[45] Date of Patent: Oct. 20, 1992

[54] APPARATUS FOR WINDING NARROW WEB STRIPS ON SLEEVES

[75] Inventor: Heinz Ziessmer, Wiehl/Mühlen, Fed. Rep. of Germany

[73] Assignee: Kampf GmbH & Co. Maschinenfabrik, Wiehl, Fed. Rep. of Germany

[21] Appl. No.: 639,659

[22] Filed: Jan. 10, 1991

[30] Foreign Application Priority Data

Jan. 10, 1990 [DE] Fed. Rep. of Germany ....... 4000469

[51] Int. Cl.$^5$ ...................... B65H 18/04; B65H 75/24
[52] U.S. Cl. .................................. 242/68.3; 242/72.1
[58] Field of Search ................. 242/68.3, 72.1, 56.9, 242/56.4, 68.2, 72 R; 279/2 R

[56] References Cited

U.S. PATENT DOCUMENTS

| | | |
|---|---|---|
| 2,749,133 | 6/1956 | Rich .............................. 242/68.2 X |
| 3,490,716 | 1/1970 | Miller et al. ...................... 242/68.3 |
| 3,542,305 | 11/1970 | Feierabend ......................... 242/68.3 |
| 3,606,188 | 9/1971 | Wagner ............................. 242/68.3 |
| 3,970,262 | 7/1976 | Brown et al. ....................... 242/68.3 |
| 3,998,400 | 12/1976 | Gee et al. ......................... 242/68.3 |

FOREIGN PATENT DOCUMENTS 1921344 11/1971 Fed. Rep. of Germany.
2459231 6/1976 Fed. Rep. of Germany.

Primary Examiner—John M. Jillions
Attorney, Agent, or Firm—Herbert Dubno

[57] ABSTRACT

A winding apparatus for narrow strips has a clamping head on a swingable arm which has a support ring and a clamping ring provided to control a spring ring which engages the sleeve on which the strip is to be wound. According to the invention, the head is locked in a clamped position by axial displacement of the clamping ring relative to the support ring and is locked in this position by locking elements which are released when an actuating member is moved axially relative to the support ring.

15 Claims, 2 Drawing Sheets

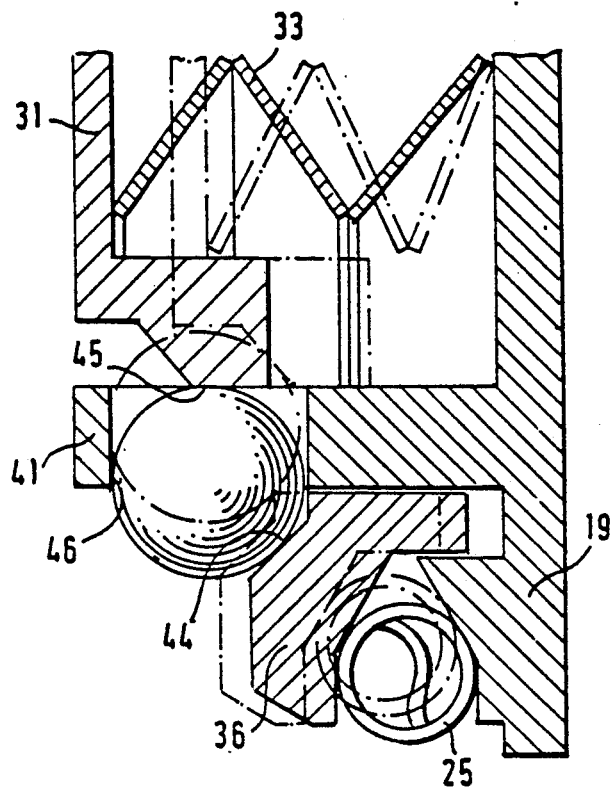
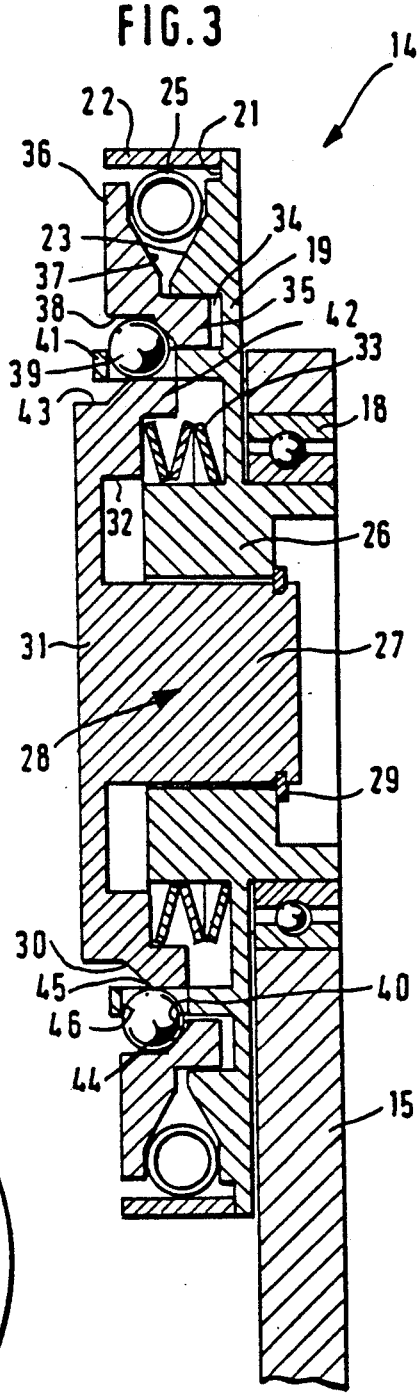
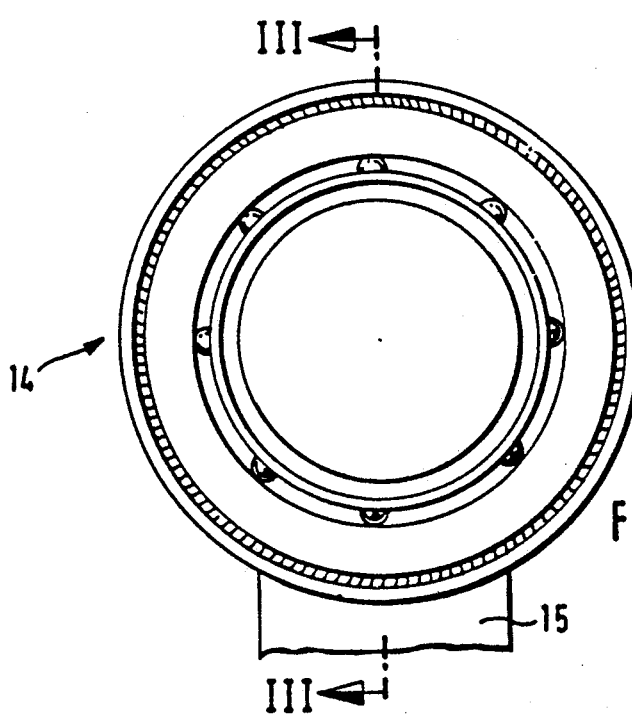

APPARATUS FOR WINDING NARROW WEB STRIPS ON SLEEVES

FIELD OF THE INVENTION

My present invention relates to an apparatus for winding narrow web strips of paper, foil, film or the like, especially strips of very thin film, on sleeves to form rolls. The invention also relates to a method for releasably mounting the winding sleeves on the machine.

More specifically, the invention relates to a winding machine for winding rolls of small webs or strips of paper, foil or the like, especially narrow webs of very thin film or foil, upon independently driven winding sleeves which may be releasably mounted on clamping heads rotatable on a free end of a swingable support arm and wherein the clamping head comprises at least two rings movable relatively in an axial direction and at least one of which has an inclined surface for displacing radially a resilient clamping element, and wherein the head is further provided with an arresting device for arresting the rings in a clamping position in which the sleeve is engaged and in a position in which the sleeve is released for removal of a roll and mounting of a new sleeve.

BACKGROUND OF THE INVENTION

For the winding of narrow webs or strips of paper, foil or the like and especially strips of the thinnest foils as may be used in the fabrication of condensers, a multiplicity of winding sleeves can be provided on an equal number of clamping heads with swingable arms disposed one alongside another. The swingable support arms are pivotally mounted at their pivoted ends on a common pivot axis to swing in the machine frame. The mounting of empty winding sleeves on the clamping heads and the removal of finished rolls in such systems is time consuming since, for that purpose, the swing arms must by swung into an unloading position. In this position, the finished roll must be removed and an empty or new winding sleeve set upon the head.

For this purpose in the conventional clamping arrangement, the two rings are coupled together by outer and inner threads which require that a screwing operation be carried out to displace the rings apart and together axially.

A bronze ring is provided between the two clamping rings, each of which has an inclined surface so that, depending upon the axial positions of the clamping rings, the resilient ring can either be pressed outwardly to engage the sleeve or retracted inwardly to release the sleeve.

The relative rotation which effects the screwing action requires special tools, namely, one tool to hold one of the clamping rings in place, i.e. a tool with projecting pins which can engage through an opening in the support arm, and a tool engageable with the other clamping ring from the opposite side. Bores or suitably shaped recesses engageable by the tools must also be provided.

With the aid of the two tools, the clamping rings can be relatively rotated so that the bronze ring is displaced outwardly or inwardly. The bronze ring moves inwardly because of its intrinsic resiliency.

One of the problems with this earlier system is that the bronze ring cannot guarantee an effective clamping of the sleeve to insure uniform winding of the strip thereon. Frequently, the sleeve is compacted to an extent that the finished roll cannot be removed and inner turns of the roll may not be under the same radial pressure as outer turns thereof.

It has been proposed to obviate this problem by providing elastic rings which can be set into the outer surface of the bronze ring, e.g. in the form of rubber O-rings. Nevertheless, the amount of handling, the time required for mounting a new sleeve and dismounting a finished rod through the use of special tools, and the like have made the cost of operation of such systems prohibitive and has caused the rolls to vary in hardness in spite of the greatest care of the personnel operating the system German Open Application 24 59 231 describes a coiling machine of the aforedescribed type in which one of the clamping rings has an inclined surface which cooperates with a spring ring to press the latter against the inner surface of the winding sleeve. The two clamping rings are directly connected via inner and outer screw threads so that a relative rotation of the two rings is essential to effect the displacement which presses the spring ring outwardly along the inclined surface or, inversely, allows the intrinsic resiliency of the spring ring to draw this ring inwardly and release the sleeve. For the release process a special pressing button is required and is accessible through an opening in the support arm for engagement in an opening of a respective ring to secure the latter against rotation.

In this system, it is a disadvantage that the button must be pressed during the entire releasing operation since the relative axial positions of the two rings can be adjacent exclusively by the screwing action of the screw threads. There is a danger that there will be undesirable shifting and a jamming of the system. In manual operation it is possible during rotation of the second ring by insertion of the fingers in corresponding finger openings that a finger can come into contact with the first or stationary disk or ring and result in injury to the operator.

In an alternative construction, the pushbutton can be eliminated but, in this case, tools are required to achieve the relative rotation of the two rings with the drawbacks outlined above.

OBJECTS OF THE INVENTION

It is, therefore, the principal object of the present invention to provide an improved apparatus for the rolling of narrow webs or strips of paper, foil or the like, especially the thinnest of foils in narrow strips, which simplifies the removal of the finished rolls and mounting of the new sleeves, eliminates the need for tools and can minimize the force which is applied to the sleeve while nevertheless insuring reliable centering and clamping thereof.

Another object of the invention is to provide an improved apparatus for the purposes described which allows especially rapid removal of the completed roll and mounting of the new sleeve.

It is also an object of this invention to provide an improved method of mounting a sleeve on a clamping head and removing a completed roll therefrom.

SUMMARY OF THE INVENTION

These objects are achieved, in accordance with the invention in an apparatus for winding a narrow thin web of flexible material, namely, narrow webs or strips of paper of foil and especially strips of the thinnest foil on winding sleeves, the apparatus comprising:

a swingable support arm;

a sleeve-clamping head rotatable on the support arm; and winding means cooperating with the head when said arm is swung toward the winding means for winding a roll of narrow web strip on the sleeve, the sleeve-clamping head comprising:

a first ring rotatable about an axis on the support arm, a second ring coaxial with the first ring, the rings being relatively shiftable axially and being formed with at least one annular inclined surface, the rings being slidably interfitting with one another, a resilient clamping element engaged between the rings and cammed outwardly by the surface for engaging the sleeve and securing same on the head, and arresting means for releasably retaining the rings selectively in a clamping position in which the clamping element secures the sleeve on said head and a release position in which the clamping element is retracted and releases the sleeve for replacement of a roll by a new sleeve on said head, the arresting means including:

an axially shiftable actuating member on the first ring, spring means braced against the axially shiftable actuating member for resisting axial displacement thereof, and locking elements cooperating with the axially shiftable actuating member for blocking relative axial displacement of the rings.

The method of the invention comprises the steps of:

manually pressing a actuating member of the head axially against a spring force to permit locking elements to follow axial movement of the actuating member without play and release a pair of rings for mutual axial movement in one direction to permit retraction of a clamping element retained between the rings;

resiliently bracing the rings in the one direction;

placing a new sleeve on the head;

manually pressing the rings axially in a direction opposite the one direction to permit the locking elements to follow axial movement of one of the rings without play while the spring force displaces the actuating member in the one direction to displace the clamping element outwardly into engagement with the new sleeve; and automatically locking the aforementioned one of the rings with said locking elements to retain the clamping element in engagement with said new sleeve.

According to the invention, therefore, the clamping device is self centering and of especially simple construction, capable of being operated exclusively by hand since the index finger of each hand can engage behind the first disk or ring while the thumbs or at least one thumb can press upon the actuating member to release the sleeve and can press upon the second ring to reengage the clamping spring with a new sleeve, the arresting device automatically retaining the rings in their clamping or released positions.

The first or support ring can be formed with a circumferentially continuous abutment shoulder along the outer edge of this ring for engagement by the sleeve, thereby exactly positioning it. In addition, it can also have a cage for receiving the locking elements. The second ring or clamping ring and the actuating member can each have along opposite sides of the cage, a recess accommodating the elements and a surface which engages the locking elements when the latter are in the recess of the other member, the aforementioned surfaces being preferably formed on axially extending annular flanges of the second ring and the actuating member, respectively, received in grooves or recesses of the first ring.

For releasing the sleeve, the centrally located actuating member is axially displaced in a slidable manner and without a screw action against a spring force whereas for reengaging the spring ring with a sleeve, the second or clamping ring is axially displaced without a screw action and against a spring force. In both cases, the axial displacement can be effected by simply pressing with the thumbs against the actuating member and the second ring respectively.

This system has the advantage that the relatively narrow sleeves can be pressed precisely against the abutment shoulder of the support ring and can be precisely centered thereon by the finger pressure applied to the second ring.

To simplify the movement of the locking elements between the release and clamping positions it has been found to be advantageous to provide between the annular flange and the annular recess of the clamping ring and the annular flange and the annular recess of the actuating member, respective inclined shoulders. Where these shoulders have the same inclination, the locking elements can move readily without play from one position to the other.

According to a further feature of the invention the projecting annular flange of the second ring engages in a corresponding groove or recess in the first ring. This interaction of the flange and groove insures exact centering of the rings relative to one another and contributes to the precise centering of the sleeve.

Also to insure precise centering, the first or support ring is provided with a sleeve-like hub portion whose outer surface carries a rolling bearing, especially a ball bearing, for rotatably mounting the support ring in the support arm and whose inner surface forms a guide surface for a central pin of the actuating member.

To further simplify actuation and manipulation, the pin, at its end remote from the support arm, is formed with a plate at an outer edge of which the respective annular flange and annular recess are provided. A compression spring can be provided between the inner surface of this plate and the first ring.

While it is possible to provide the inclined surface only on the support ring, it has been found to be advantageous to provide a corresponding inclined surface on the clamping ring, i.e. the second ring as well. The two inclined surfaces can include angles between 30° and 50° with the vertical. When the clamping element is formed as a one piece spring ring, it has been found that a so-called flaked spring is advantageous. Such springs have the advantage that they have a significant elasticity capable of compensating for tolerances in diameters of the winding sleeves. Locking elements are preferably balls.

The axial shifting movement of the two rings can be limited by a locking ring or the like. If necessary, or desirable, the clamping device can be adjusted by a nut on an external thread on the pin of the actuating body to set a ground state, i.e. an axial relative position of the actuating member and the support ring prior to axial displacement of the actuating member.

BRIEF DESCRIPTION OF THE DRAWING

The above and other objects, features and advantages of my invention will become more readily apparent from the following description, reference being made to the accompanying highly diagrammatic drawing in which:

FIG. 2 is an enlarged detailed elevational view of a clamping head on one of the swingable arms of this machine;

FIG. 3 is a section taken along the line III—III of FIG. 2, drawn to a larger scale;

FIG. 4 is a detailed view of a portion of the clamping device of FIG. 3 drawn to still a larger scale.

SPECIFIC DESCRIPTION

Figure 1:
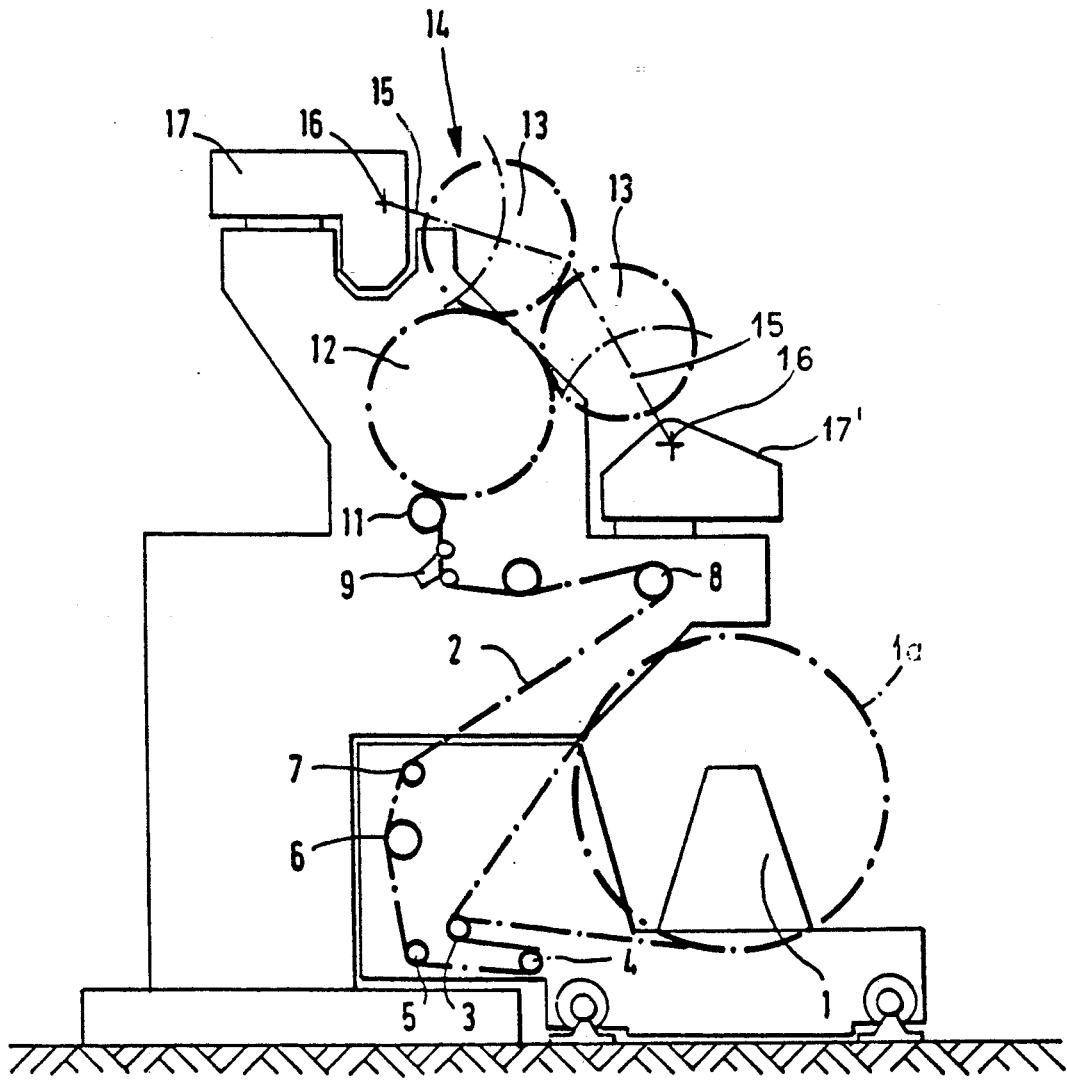
FIG. 1 is a schematic side elevational view of a web splitting and winding machine according to the invention.

As can be seen from FIG. 1, the web splitting and roll winding machine comprises a pay-off or supply roll 1a supported by trunnions 1 and from which a web 2 of the paper, foil or the like passes over a deflecting roller 3 and a dancer roller 4 to a transport roller 5. In the direction of movement of the web, the web then passes across a stretching roller 6 which spreads the web in its width and a sensing roller 7.

The web then passes via further deflector rollers 8 to a splitting device as provided with cutters which subdivide the web into narrow strips of several mm in width. The cutting device is represented by the blade 9.

The strips pass between a pressing roller 11 and a winding cylinder 12 and then along the winding cylinder 12 to respective coils or rolls 13. In the illustrated embodiment, two rolls 13 have been illustrated and are shown to be identical. Each is formed on a respective clamping head 14 which is rotatable on a swingable support arm 15 shown only in highly diagrammatic form. It will be understood that perpendicular to the plane of the drawing, a number of such clamping heads 14 are provided on respective support arms 15 which are swingable about the common pivot axes 16 on slides 17 and 17' shiftable on the machine frame perpendicular to the plane of the paper in FIG. 1. Each of the clamping heads 14 can receive a respective winding sleeve for winding up the respective roll. The upper arms 15 can then swing in the counter clockwise sense while the lower arms 15 can be swung in the clockwise sense away from the winding drum 12 for removal of a finished roll and replacement of a new sleeve thereon.

in FIG. 2, one of the support arms 15 with its clamping head 14 has been illustrated to a larger scale. The construction of the clamping head is best seen in FIG. 3.

From FIG. 3 it will be apparent that a support ring 19, also referred to herein as the first ring, is journaled in the arm 15 by a ball bearing 18. The support ring 19 is formed at its outer edge with an annular shoulder 21 which forms a stop for the roll sleeve 22 which is clamped therein and also has an inclined surface 23 including an angle of about 30° with the vertical. The inclined surface 23 bears upon a spring ring 25 which can be a toroidal spring but preferably is a laminated or so-called flake spring. When the spring ring 25 is pressed outwardly, it engages the winding sleeve 22 which abuts the shoulder 21.

The support ring 19 has a sleeve-shaped hub portion 26 on the inner surface of which a pin 27 of an actuating member 28 is axially guided, the axial shiftability of member 28 being limited by an abutment ring 29 carried by the pin.

The pin 27 extends into a plate 31, at an inner side of which an annular recess 32 is formed. The inner wall of this recess 32 rides on the outer surface of the hub part 26. Between the inner side of plate 31 and the support ring 19, compression spring means can be distributed as represented at 33. In the embodiment shown, the compression spring means is formed by dished-disk or Belleville spring washers which press the actuating member 28 and the support ring 19 apart until the abutment ring 29 engages the hub 26. In other words the compression spring means 33 allows an axial relative movement of the support ring 19 and the actuating member 28.

At an outer portion, the support ring 19 is formed at its inner side with an annular groove 34 slidably receiving an annular flange 35 of a clamping ring 36 also referred to herein as the second ring. The second ring 36 has, like the support ring 19, an inclined surface 37 which includes an angle of about 30° with the vertical. This inclined surface bears upon the spring ring 25 like the surface 23.

Between the flange 35 and the groove 34, air is found so that the clamping ring 36 can be axially shifted relative to the support ring 19. In the region of the annular flange 35, the clamping ring 36 has a setback or annular recess 38 for partially receiving locking elements, namely, balls 39, distributed around the periphery of the actuating member 28.

The balls 39 are received in a cage 41 formed on the support ring 19.

Like the clamping ring 36, the actuating member 28 has an annular flange 42 guided on the support ring 19 and an annular recess 43 which also can receive the balls as will be described below. The transitions below the annular flanges and the respective recesses are formed by inclined shoulders 30 and 40.

Figure 5:
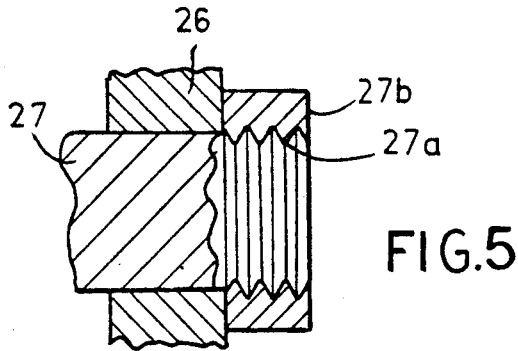
FIG. 5 is a view of a portion of the head of FIG. 3 illustrating an alternative arrangement permitting adjustment of the actuating member.

If it is important to provide an adjustable axial ground setting between the support ring 19 and the actuating member 28 and thus for the clamping ring 36, the pin 27 can be provided with an external screwthread 27a engageable by a nut 27b which can press against the hub portion 26 as shown in FIG. 5.

In FIG. 3, the clamping head is shown in its clamping position. The clamping position has also been illustrated in continuous lines in FIG. 4 while the release position is shown in dot dash lines in FIG. 4.

In the clamping position, the balls 39 bear at the locations 44, 45 and 46 against the inclined shoulder 40 between the annular flange 35 and the recess 38, on the outer side of the annular flange 42 of the actuating member 28 and on the inner side of the cage 41.

The spring ring 25 is held outwardly between the two inclined surfaces 23 and 27 so that a winding sleeve 22 is engaged and the sleeve is centered against the shoulder 21.

To release the clamping action, for example to remove a finished roll and place a fresh sleeve thereon, the support arm 15 is swung about its pivot axis 16 outwardly. The operator then grips behind the support arm 15 or the support ring 19 with his two index fingers and presses with one or both thumbs against the plate 31 to shift the actuating member 28 to the right against the effect of the spring 33 FIG. 3). The balls 39 then are permitted to pass into the annular recess 43 at least in part because of the leftward displacement of the ring 36 by the intrinsic tension on the spring ring 25 so that the spring ring contracts and the sleeve 22 with its full roll thereon can be removed.

In this position, an empty winding sleeve 22 can be placed over the clamping head. To engage this sleeve 22, with the index fingers again behind the arm 15 or the support ring 19, the thumbs of the operator press the ring 36 toward the ring 19, thereby camming the spring ring 25 outwardly and retaining the sleeve 22.

Since this action places the recess 38 in line with the balls, the action of spring 33 to shift the actuating member 28 to the left, causes the ramp 30 to cam the balls outwardly into the recesses 38 and the position shown in FIG. 3 is resumed, i.e. the rings are locked in the clamped position.

It will be apparent that the locking action is automatic and that the device is easy to operate and affect self centering of the sleeve. Relatively small force is necessary for the manual displacement of the actuating member 28 and the ring 36.

It is possible, in accordance with the invention to provide the bearing 18 by a corresponding modification of the configuration of the support arm 15 and the hub 26 of the bearing ring 16 so that it lies in a region below the spring ring 25 and provides still better support. The inclined shoulders of the bearing ring and the spring ring can also be provided on opposite sides from those shown with reversal of the effective direction of the spring 33 and the function thereof. In another alternative a laminated spring ring 25 may also be used as described.

I claim:

1. An apparatus for winding at least one roll of a narrow web strip on a sleeve, comprising:
    a swingable support arm;
    a sleeve-clamping head rotatable on said support arm; and
    winding means cooperating with said head when said arm is swung toward said winding means for winding a roll of narrow web strip on said sleeve, said sleeve-clamping head comprising:
        a first ring rotatable about an axis on said support arm,
        a second ring coaxial with said first ring, said rings being relatively shiftable axially and being formed with at least one annular inclined surface, said rings being slidably interfitting with one another,
        a resilient clamping element engaged between said rings and cammed outwardly by said surface for engaging said sleeve and securing same on said head, and
        arresting means for releasably retaining said rings selectively in a clamping position in which said clamping element secures said sleeve on said head and a release position in which said clamping element is retracted and releases said sleeve for replacement of a roll by a new sleeve on said head, said arresting means including:
    an axially shiftable actuating member on said first ring,
    spring means braced against said axially shiftable actuating member for resisting axial displacement thereof, and
    locking elements cooperating with said axially shiftable actuating member for blocking relative axial displacement of said rings, said locking elements and said rings being constructed and arranged so that manual pressing of said actuating member toward said first ring displaces said locking elements into a release position and manual pressing of said second ring toward said first ring displaces said locking elements into said clamping positions.

2. An apparatus for winding at least one roll of a narrow web strip on a sleeve, comprising:
    a swingable support arm;
    a sleeve-clamping head rotatable on said support arm; and
    winding means cooperating with said head when said arm is swung toward said winding means for winding a roll of narrow web strip on said sleeve, said sleeve-clamping head comprising:
        a first ring rotatable about an axis on said support arm,
        a second ring coaxial with said first ring, said rings being relatively shiftable axially and being formed with at least one annular inclined surface, said rings being slidably interfitting with one another.
        a resilient clamping element engaged between said rings and cammed outwardly by said surface for engaging said sleeve and securing same on said head, and
        arresting means for releasably retaining said rings selectively in a clamping position in which said clamping element secures said sleeve on said head and a release position in which said clamping element is retracted and releases said sleeve for replacement of a roll by a new sleeve on said head, said arresting means including:
    an axially shiftable actuating member on said first ring,
    spring means braced against said axially shiftable actuating member for resisting axial displacement thereof, and
    locking elements cooperating with said axially shiftable actuating member for blocking relative axial displacement of said rings said first ring forming a support ring for said head and being formed with a circumferentially continuous abutment shoulder for said sleeve, and a cage for receiving said locking elements, said second ring being formed with a recess accommodating said locking elements in one of said positions and an engagement surface against which said locking elements engage, said actuating member being formed opposite said recess and said engagement surface across said cage with a recess formed in said actuating member and receiving said locking elements in the other of said positions and another engagement surface engageable with said locking elements.

3. The apparatus defined in claim 2 wherein respective transition surfaces between each of said recesses and the respective engagement surface is formed as inclined camming shoulder.

4. The apparatus defined in claim 2 wherein said second ring is formed with an axially projecting annular flange received in an axially open groove formed in said first ring.

5. The apparatus defined in claim 2 wherein said first ring has a sleeve-shaped hub portion having an outer surface carrying a rolling bearing for journaling said first ring on said arm and an inner surface forming a guide surface for a central pin of said actuating member.

6. The apparatus defined in claim 5 wherein said pin has an end turned toward said arm and an end turned away from said arm, said end turned away from said arm carrying a plate having an outer edge formed with the said recess and engagement surface of said actuating member.

7. The apparatus defined in claim 6 wherein said spring means comprises compression springs braced between mutually juxtaposed surfaces of said plate and said first ring.

8. The apparatus defined in claim 2 wherein both of said rings are provided with inclined surfaces acting upon said resilient clamping element.

9. The apparatus defined in claim 8 wherein said inclined surfaces include angles of 30° to 50° with the vertical.

10. The apparatus defined in claim 8 wherein said resilient clamping element is a one piece spring ring.

11. The apparatus defined in claim 10 wherein said one piece spring ring is a laminated spring.

12. The apparatus defined in claim 2 wherein said locking elements are balls.

13. The apparatus defined in claim 6 wherein said end of said pin turned toward said arm is provided with an abutment ring limiting axial displacement of said actuating member on said first ring.

14. The apparatus defined in claim 6 wherein said end of said pin turned toward said arm is provided with an external thread carrying a nut adjustable to control a position of said actuating member on said first ring.

15. A method of releasably clamping a sleeve for winding at least one roll of a narrow web strip on the sleeve in a roll-winding apparatus comprising a swingable support arm, a sleeve-clamping head rotatable on said support arm, and winding means cooperating with said head when said arm is swung toward said winding means for winding a roll of narrow web strip on said sleeve, said method comprising the steps of:

manually pressing an actuating member of said head axially against a spring force to permit locking elements to follow axial movement of the actuating member without play and release a pair of rings for mutual axial movement in one direction to permit retraction of a clamping element retained between said rings;

resiliently bracing said rings in said one direction;

placing a new sleeve on said head;

manually pressing said rings axially in a direction opposite said one direction to permit said locking elements to follow axial movement of one of said rings without play while said spring force displaces said actuating member in said one direction to displace said clamping element outwardly into engagement with said new sleeve; and automatically locking said one of said rings with said locking elements to retain said clamping element in engagement with said new sleeve.

* * * * *